United States Patent
Henry

(10) Patent No.: US 12,028,419 B1
(45) Date of Patent: *Jul. 2, 2024

(54) SYSTEMS AND METHODS FOR PREDICTIVELY DOWNLOADING VOLUMETRIC DATA

(71) Applicant: Meta Platforms Technologies, LLC, Menlo Park, CA (US)

(72) Inventor: Colleen Kelly Henry, Oakland, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/296,955

(22) Filed: Apr. 6, 2023

Related U.S. Application Data

(63) Continuation of application No. 17/586,734, filed on Jan. 27, 2022, now Pat. No. 11,659,043.

(51) Int. Cl.
*G06F 15/16* (2006.01)
*G06F 3/01* (2006.01)
*G06T 19/00* (2011.01)
*H04L 67/131* (2022.01)

(52) U.S. Cl.
CPC ............ *H04L 67/131* (2022.05); *G06F 3/013* (2013.01); *G06T 19/006* (2013.01)

(58) Field of Classification Search
CPC ...... H04L 67/131; G06F 3/013; G06T 19/006
USPC ........................................................ 709/219
See application file for complete search history.

(56) References Cited

U.S. PATENT DOCUMENTS

| | | | |
|---|---|---|---|
| 9,786,251 B1 | 10/2017 | Gordin et al. | |
| 10,088,902 B2* | 10/2018 | Keller | G06F 3/0304 |
| 10,262,461 B2 | 4/2019 | Nakashima et al. | |
| 10,585,472 B2* | 3/2020 | Tokubo | A63F 13/53 |
| 10,712,818 B2* | 7/2020 | Keller | G09G 5/003 |
| 10,713,834 B2 | 7/2020 | Nakashima | |
| 10,739,861 B2* | 8/2020 | Kin | G06V 40/18 |

(Continued)

FOREIGN PATENT DOCUMENTS

WO 2019202207 A1 10/2019

OTHER PUBLICATIONS

International Search Report and Written Opinion for International Application No. PCT/US2023/011722, dated Apr. 25, 2023, 8 pages.

*Primary Examiner* — Moustafa M Meky
(74) *Attorney, Agent, or Firm* — Greenberg Traurig, LLP

(57) ABSTRACT

A computer-implemented method for predictively downloading volumetric data may include (i) identifying an augmented reality device that (a) downloads volumetric data files representing pre-rendered three-dimensional segments of physical space within an augmented reality environment and (b) displays the augmented reality environment for viewing by a user, (ii) determining, based at least in part on a position of the user within the augmented reality environment, an expected physical space within the augmented reality environment that the user is predicted to view via the augmented reality device, and (iii) preemptively downloading, to the augmented reality device, a volumetric data file representing a pre-rendered three-dimensional segment of the expected physical space. Various other methods, systems, and computer-readable media are also disclosed.

20 Claims, 10 Drawing Sheets

(56) References Cited

U.S. PATENT DOCUMENTS

| | | | |
|---|---|---|---|
| 10,743,004 B1 | 8/2020 | Waggoner et al. | |
| 10,895,952 B2 | 1/2021 | Hong et al. | |
| 10,896,545 B1 * | 1/2021 | Kin | G02B 27/0172 |
| 11,024,094 B2 | 6/2021 | Huang et al. | |
| 11,050,991 B2 | 6/2021 | Varekamp et al. | |
| 11,074,737 B2 | 7/2021 | Nakashima | |
| 11,156,101 B2 | 10/2021 | Quach et al. | |
| 11,157,725 B2 * | 10/2021 | Andersen | G06V 10/764 |
| 11,327,630 B1 * | 5/2022 | Khan | G06F 3/012 |
| 11,659,043 B1 * | 5/2023 | Henry | H04N 21/44218 |
| | | | 709/219 |
| 11,666,825 B2 * | 6/2023 | Delamont | G06T 19/006 |
| | | | 463/32 |
| 2011/0078717 A1 | 3/2011 | Drummond et al. | |
| 2014/0354515 A1 | 12/2014 | LaValle et al. | |
| 2016/0219325 A1 | 7/2016 | Chu et al. | |
| 2018/0286122 A1 | 10/2018 | Nakashima et al. | |
| 2019/0212827 A1 * | 7/2019 | Kin | G02B 27/0172 |
| 2019/0212828 A1 * | 7/2019 | Kin | G06F 3/04815 |
| 2019/0250791 A1 | 8/2019 | Hong et al. | |
| 2019/0273902 A1 | 9/2019 | Varekamp et al. | |
| 2019/0333262 A1 | 10/2019 | Chen et al. | |
| 2020/0005539 A1 * | 1/2020 | Hwang | G06F 3/167 |
| 2020/0126280 A1 | 4/2020 | Amimoto et al. | |
| 2020/0242827 A1 | 7/2020 | Nakashima | |
| 2020/0312031 A1 | 10/2020 | Huang et al. | |
| 2020/0368616 A1 | 11/2020 | Delamont | |
| 2021/0065427 A1 | 3/2021 | Wade | |
| 2021/0110610 A1 | 4/2021 | Xu et al. | |
| 2021/0406529 A1 * | 12/2021 | Andersen | A63F 13/428 |
| 2022/0185435 A1 | 6/2022 | Nishiyama | |

* cited by examiner

SYSTEMS AND METHODS FOR PREDICTIVELY DOWNLOADING VOLUMETRIC DATA

CROSS REFERENCE TO RELATED APPLICATION

This application is a continuation of U.S. application Ser. No. 17/586,734, filed 27 Jan. 2022, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
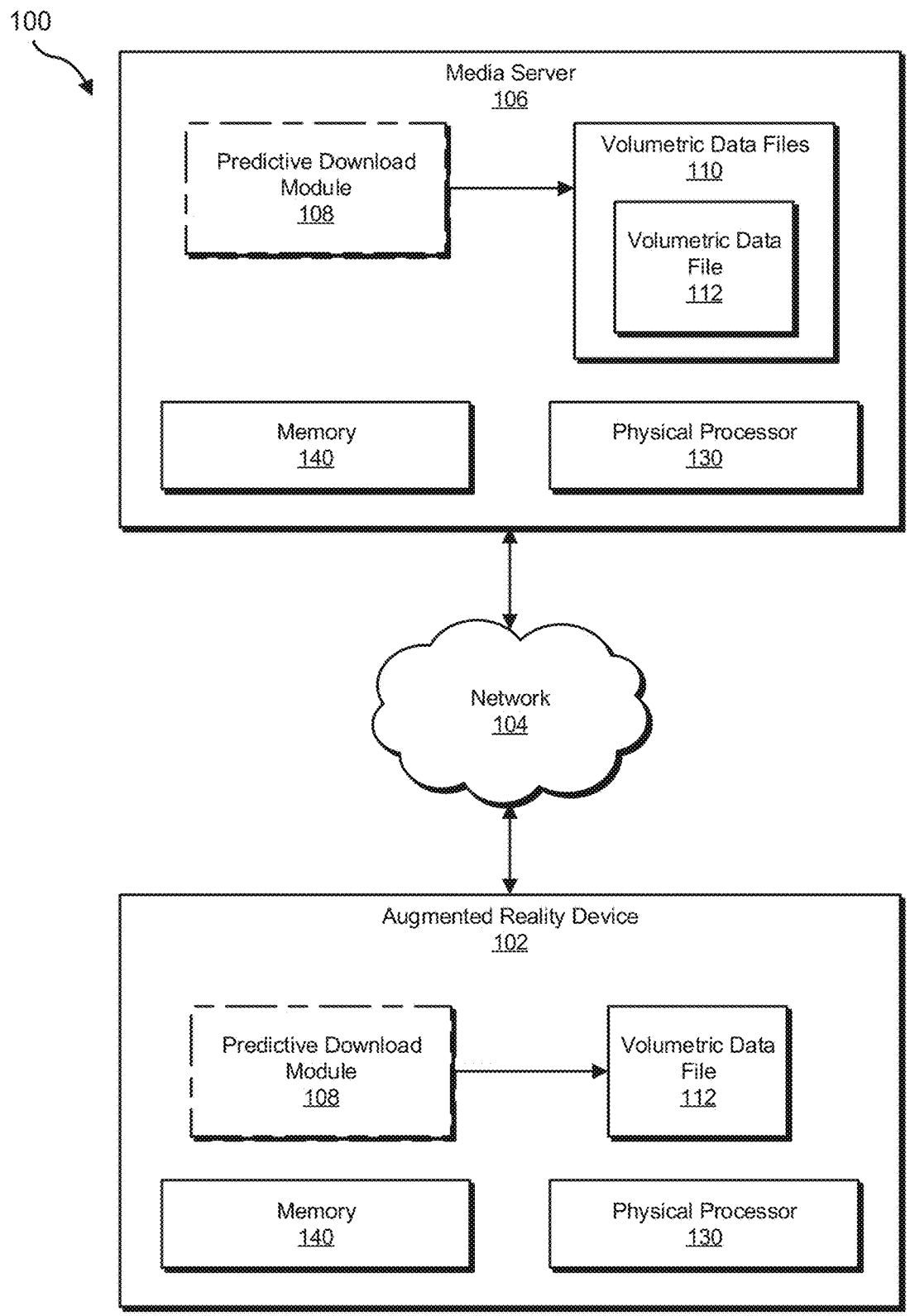
FIG. 1 is a block diagram of an exemplary system for predictively downloading volumetric data.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawings and claims.

DETAILED DESCRIPTION OF EXEMPLARY EMBODIMENTS

Systems for enabling users to interact in an augmented reality (AR) environment, sometimes also described as artificial reality and/or virtual reality, may have different data needs than systems for streaming other types of data such as audio or video. The present disclosure is generally directed to systems and methods for enabling a high-quality user experience on an AR device with limited data storage by predictively downloading pre-rendered volumetric data describing an AR environment as the data is expected to be needed.

In some examples, a user may experience an AR environment via an endpoint AR device with limited storage such as a headset that is not capable of storing the volumetric data for the entire AR environment. In some embodiments, large volumetric data files representing pre-rendered three-dimensional segments of a physical space ("cubes") may be stored on a media server or other non-endpoint-device (e.g., laptop, smart phone, specialized AR media processing device) for download to the endpoint device. The disclosed system may predict which cube is expected to be needed next by the headset and may download the cube to the headset, which may store a limited number of cubes at a time in a buffer (e.g., twenty-seven cubes, sixteen cubes, twenty five cubes, etc.). For example, if a user is traveling down a virtual hallway, the disclosed system may download a cube representing the next section of the hallway.

The disclosed systems may predict upcoming cubes in a variety of ways based on user movement, user gaze, the layout of the virtual environment, historical data on how other users have moved through the virtual environment, and/or other factors. In some embodiments, the disclosed system may transmit a mix of pre-rendered and streaming data. For example, a user on a museum tour may experience pre-downloaded cubes of volumetric data representing the museum and a live streaming avatar of a museum tour guide. In some embodiments, the disclosed system may trigger certain events when a user enters a cube. For example, an audio description of an art piece in a museum may trigger when the user enters the cube containing the art piece. In some embodiments, the disclosed system may mix pre-rendered content with personalized content. For example, a pre-rendered cube may include a blank billboard that may be populated with a personalized advertisement when the cube is downloaded. In some embodiments, the disclosed system may store and/or download versions of cubes with different levels of detail in order to efficiently transmit and display distant cubes in outdoor environments.

In some embodiments, the systems described herein may improve the functioning of a computing device by enabling the computing device to provide relevant AR data to a user. Additionally, the systems described herein may improve the fields of AR and/or AR endpoint devices by enabling endpoint devices with limited storage (e.g., insufficient storage to store an entire environment) to provide a user with relevant AR data without delays or buffering.

In some embodiments, the systems described herein may predictively download volumetric data. FIG. 1 is a block diagram of an exemplary system 100 for predictively downloading volumetric data. In one embodiment, and as will be described in greater detail below, a media server 106 may include a media server that stores volumetric data files 110 representing pre-rendered three-dimensional segments of physical space within an augmented reality environment (e.g., cubes). In some embodiments, media server 106 may communicate via a network 104 with an AR device 102 that, in response to at least one predetermined trigger, downloads, from media server 106, volumetric data files 110 and displays the augmented reality environment for viewing by a user. In some embodiments, media server 106 and/or AR device 102 may be configured with a predictive download module 108 that determines, based at least in part on a position of the user within the AR environment, an expected physical space within the AR environment that the user is predicted to view via AR device 102 and triggers a download, from media server 106 to AR device 102 (e.g., via network 104), of a volumetric data file 112.

Media server 106 generally represents any type or form of backend computing device that may host volumetric data files. In one embodiment, media server 106 may include a local media server that is located within the same physical building as AR device 102 (e.g., within a user's home). Additionally or alternatively, media server 106 may include a remote media server that is not located in the same physical building as AR device 102 (e.g., a remote server in a data center). Examples of media server 106 may include, without limitation, data servers, application servers, database servers, and/or any other relevant type of server. Although illustrated as a single entity in FIG. 1, media server 106 may include and/or represent a group of multiple servers that operate in conjunction with one another. For example, media server 106 may represent a local server operating in conjunction with multiple remote (e.g., cloud) servers.

AR device 102 generally represents any type or form of computing device capable of reading computer-executable instructions. For example, AR device 102 may represent a wearable AR endpoint device, such as a headset. Additional examples of AR device 102 may include, without limitation, a wristband, a glove, a belt, a full-body AR suit, a non-wearable AR endpoint device, and/or any other suitable type of AR device.

Volumetric data files 110 generally represent any type or form of digital data that represents a three-dimensional space. In some embodiments, a volumetric data file may include a set of coordinates and one or more values for a property of the data at that coordinate. For example, a volumetric data file may specify the size, shape, color, and/or other properties of an object at a set of coordinates within the three-dimensional space. In some embodiments, a volumetric data file may include audio and/or video that plays within the three-dimensional space (e.g., on loop and/or in response to a specific trigger). In one embodiment, a volumetric data file may include game data, such as status changes that occur to a player character at certain coordinates (e.g., gaining or losing health, gaining or losing a status effect, etc.). In some embodiments, a volumetric data set may contain photonic information in the form of vectors and values of light similar to or including a light field. This data may be compressed or uncompressed. In some embodiments, a volumetric data file may represent a rectilinear and/or cubical area of space.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of the modules illustrated in FIG. 1. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of the modules stored in memory 140. Additionally or alternatively, physical processor 130 may execute one or more of the modules. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Figure 2:
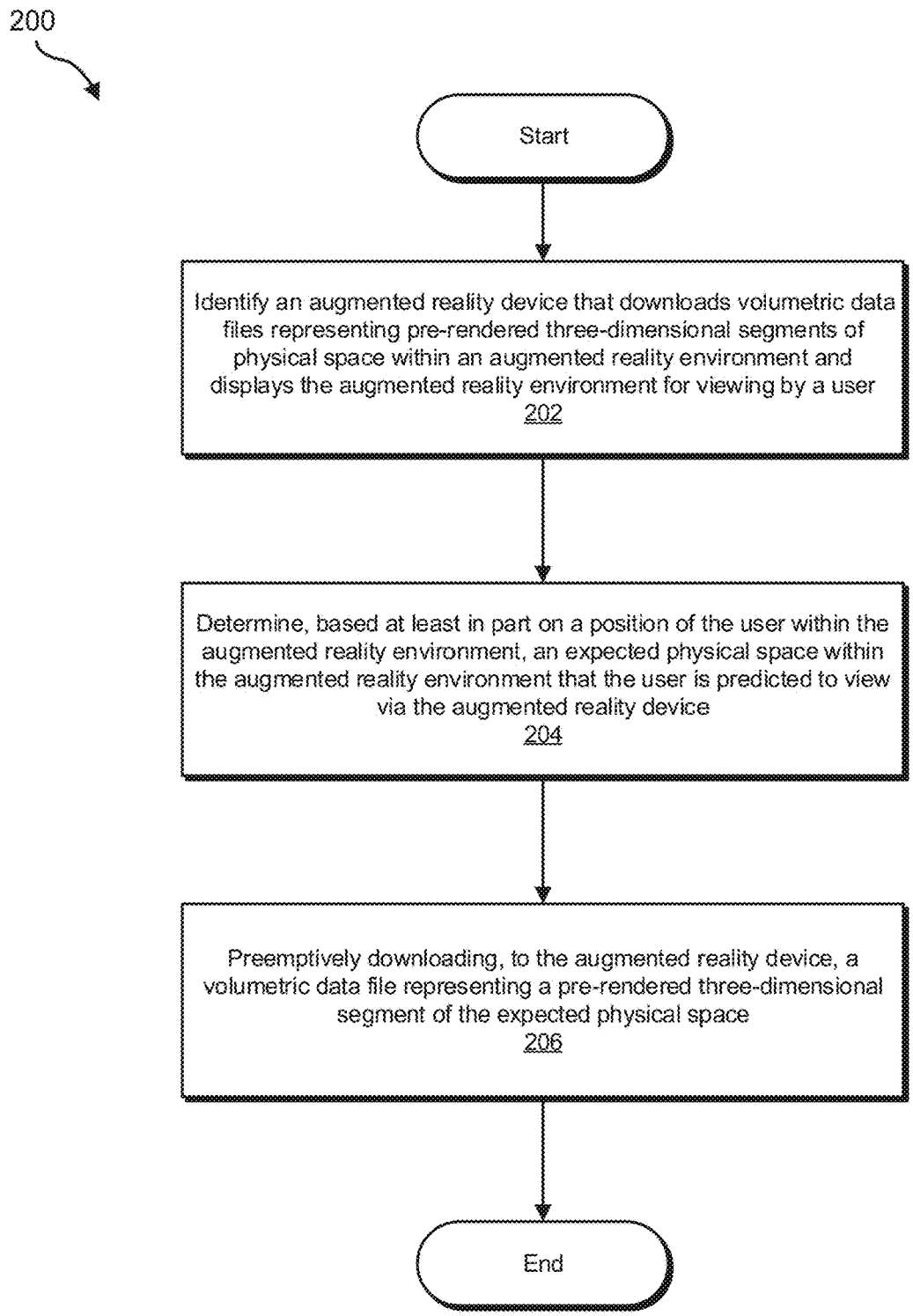
FIG. 2 is a flow diagram of an exemplary method for predictively downloading volumetric data.

FIG. 2 is a flow diagram of an exemplary method 200 for predictively downloading volumetric data. In some examples, at step 202, the systems described herein may identify an AR device that downloads volumetric data files representing pre-rendered three-dimensional segments of physical space within an AR environment and displays the AR environment for viewing by a user. For example, predictive download module 108 in FIG. 1 may identify AR device 102 that downloads volumetric data files 110.

The term "user," as used herein, may refer to a person or representation of a person interacting with an AR system. For example, a user may be a physical person who is wearing various AR devices, such as an AR headset. In another example, a user may be an avatar of a person that is a digital representation of the person moving through a digital representation of a three-dimensional environment.

Predictive download module 108 may identify AR device 102 in a variety of ways and/or contexts. In some embodiments, AR device 102 may be configured with predictive download module 108. Additionally or alternatively, media server 106 may be configured with predictive download module 108. In some examples, predictive download module 108 may identify AR device 102 as part of the system set-up for an AR system that includes AR device 102, media server 106, and/or additional AR devices (e.g., cameras, wearable devices, networking devices, etc.). In one example, predictive download module 108 may detect that AR device 102 is displaying an AR environment using volumetric data files stored on media server 106. For example, AR device 102 may be displaying an AR environment for an AR game.

In some examples, at step 204, the systems described herein may determine, based at least in part on a position of the user within the AR environment, an expected physical space within the AR environment that the user is predicted to view via the AR device. For example, predictive download module 108 in FIG. 1 may determine, based at least in part on a position of the user within the AR environment, an expected physical space within the AR environment that the user is predicted to view via AR device 102.

The systems described herein may predict the expected physical space in a variety of ways. In some embodiments, the systems described herein may monitor movement of the user through the AR environment and predict, based on the movement, that expected future movement of the user through the AR environment will bring the expected physical space into a field of vision of the user. Additionally or alternatively, the systems described herein may monitor a directionality of a gaze of the user within the AR environment (e.g., using gaze-tracking systems such as those described in further detail below in connection with FIGS. 9 and 10) and predict, based on the directionality of the gaze, that an expected future gaze of the user will bring the expected physical space into a field of vision of the user.

Figure 3:
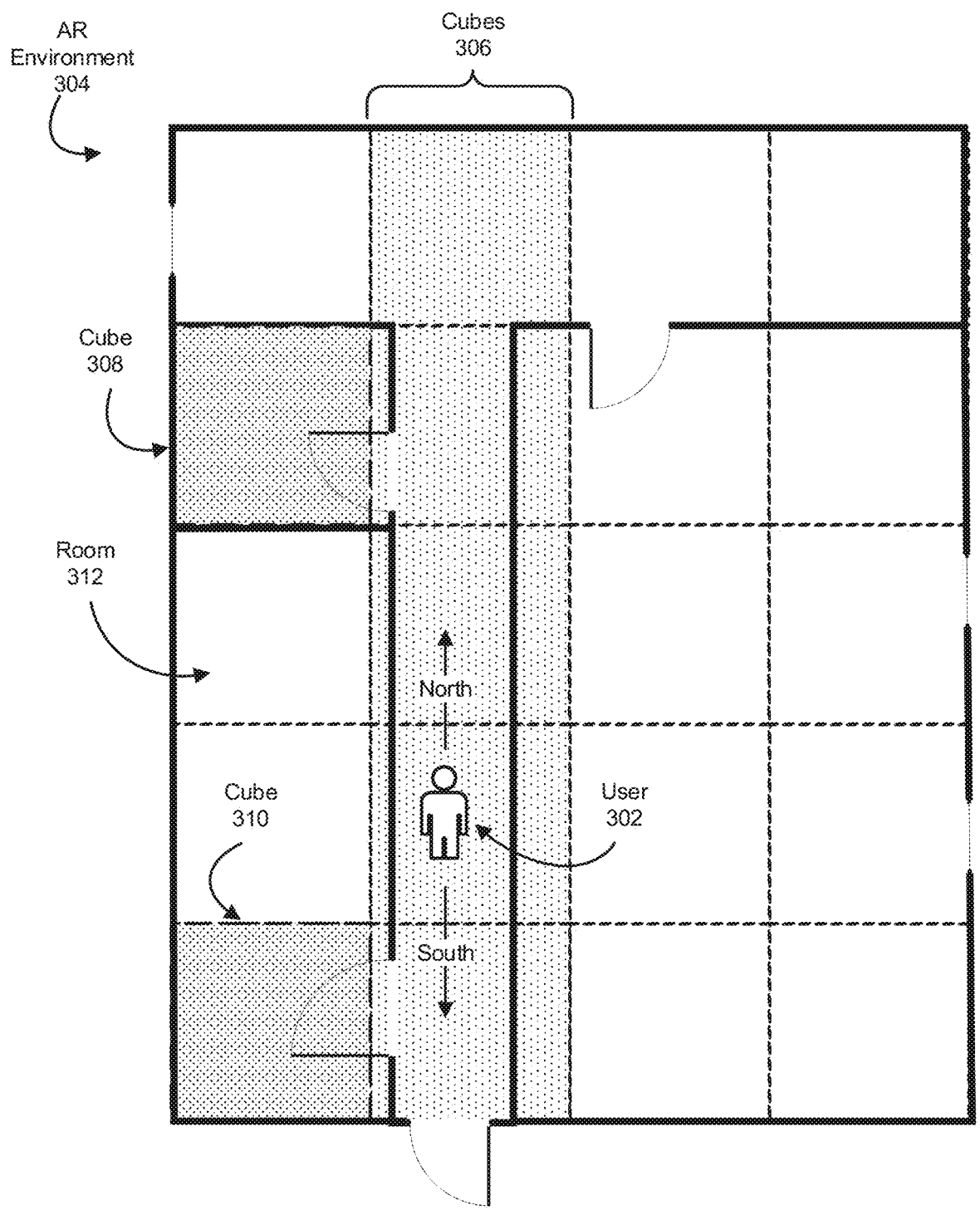
FIG. 3 is an illustration of an exemplary augmented reality environment.

For example, as illustrated in FIG. 3, a user 302 may move through an AR environment 304. In one example, AR environment 304 may include a building with various walls that block movement and/or occlude lines of sight. In this example, cubes 306 may be immediately visible to user 302 from the current position of user 302, and thus those cubes may be currently loaded into a headset worn by user 302 that displays AR environment 304. In one example, if the systems described herein detect that user 302 is moving North, the systems described herein may preemptively download (e.g., to the headset) a cube 308 that includes data for a room that will quickly become visible to user 302 as user 302 moves down the hallway. Similarly, if the if the systems described herein detect that user 302 is moving South, the systems described herein may preemptively download cube 310. If the user approaches the door to room 312, the systems described herein may preemptively download data for the remaining cubes in room 312. The systems described herein may not preemptively download data for cubes in other rooms because, despite the proximity of those cubes to user 302, the walls within the AR environment block both movement and sight.

In some embodiments, the systems described herein may only preemptively download cubes for expected physical spaces that the user is predicted to view within a predetermined window of upcoming time. Examples of predetermined windows of time may include two seconds, five seconds, ten seconds, thirty seconds, or one minute. For example, if user 302 moves South, the systems described herein may not preemptively download cube 308 because even though user 302 is likely to eventually view the physical space represented by cube 308, user 302 is currently moving in the opposite direction and is thus not likely to view the physical space represented by cube 308 within the next thirty seconds.

Returning to FIG. 2, in some examples, at step 206, the systems described herein may preemptively download, to the AR device, a volumetric data file representing a pre-rendered three-dimensional segment of the expected physical space. For example, predictive download module 108 in FIG. 1 may preemptively download, to AR device 102, volumetric data file 112.

The systems described herein may preemptively download the volumetric data file in a variety of ways. For example, the systems described herein may preemptively download the volumetric data file via a wireless network connection. In some embodiments, the systems described herein may preemptively download a set number of volumetric data files that match storage constraints on the AR device. For example, if the AR device is capable of storing data for twenty-seven cubes, the systems described herein may preemptively download cubes such that twenty seven cubes are stored on the AR device at any given time.

In some embodiments, the systems described herein may store cubes in a buffer in memory (e.g., in physical memory on a headset or other AR device) and may remove cubes from the buffer if the physical space represented by the cube is not expected to be viewed by the user within the predetermined window of time. For example, returning to FIG. 3, if user 302 enters room 312, then exits room 312 and proceeds North, the systems described herein may remove cube 310 from the buffer (e.g., by replacing cube 310 with data for another cube, such as cube 308).

Figure 4:
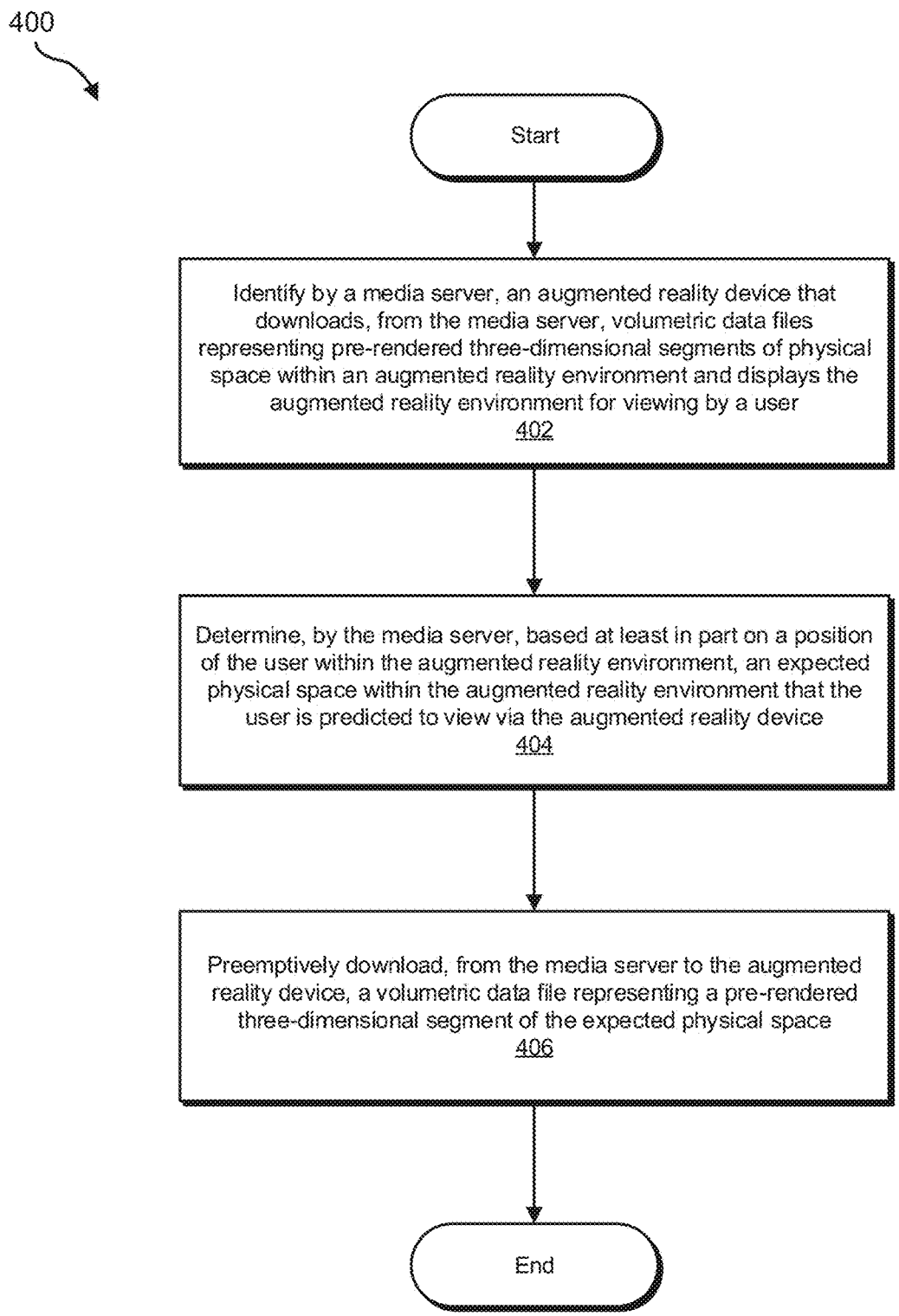
FIG. 4 is a flow diagram of an additional exemplary method for predictively downloading volumetric data.

In some embodiments, the systems described herein may be configured on a media server. FIG. 4 is a flow diagram of an exemplary method 400 for predictively downloading volumetric data via a media server. In some examples, at step 402, the systems described herein may identify, by a media server, an AR device that downloads, from the media server, volumetric data files representing pre-rendered three-dimensional segments of physical space within an augmented reality environment and displays the augmented reality environment for viewing by a user. For example, predictive download module 108 in FIG. 1 may identify, by media server 106, AR device 102.

Predictive download module 108 may identify an AR device in a variety of ways. In some embodiments, predictive download module 108 may identify an AR device as part of an initial set-up process for an AR system. Additionally or alternatively, predictive download module 108 may identify all AR devices connected to a media server as part of a boot-up process for the media server and/or an initiation process for an AR application (e.g., a game, an interactive tour application, a social media application, etc.) executing on the media server.

In some examples, at step 404, the systems described herein may determine, based at least in part on a position of the user within the AR environment, an expected physical space within the AR environment that the user is predicted to view via the AR device. For example, predictive download module 108 in FIG. 1 may determine, based at least in part on a position of the user within the AR environment, an expected physical space within the AR environment that the user is predicted to view via AR device 102.

Predictive download module 108 may determine the expected physical space in a variety of ways. For example, predictive download module 108 may mathematically calculate the distance of the physical space from the current position of the user. In some examples, predictive download module 108 may analyze data within the AR environment to determine whether any objects within the AR environment (e.g., walls, trees, fog, etc.) prevent the physical space from being visible from the user's current position. In one example, predictive download module 108 may compare a speed and directionality of movement of the user to a distance between the user and the physical space to determine when the physical space is expected to come into view.

In some examples, at step 406, the systems described herein may preemptively download, from the media server to the AR device, a volumetric data file representing a pre-rendered three-dimensional segment of the expected physical space. For example, predictive download module 108 in FIG. 1 may preemptively download, from media server 106 to AR device 102, volumetric data file 112.

Predictive download module 108 may preemptively download the volumetric data file in a variety of ways. For example, a local media server may request the file from a remote media server and then send the media file to an AR device. In some embodiments, the media server may send the file to multiple AR devices. For example, the media server may send visual and/or audio data from the file to an AR headset with a visual display surface and/or speakers and kinetic data from the file to a set of AR gloves with elements that provide haptic feedback to a user when interacting with objects in the physical space represented by the file.

Figure 5:
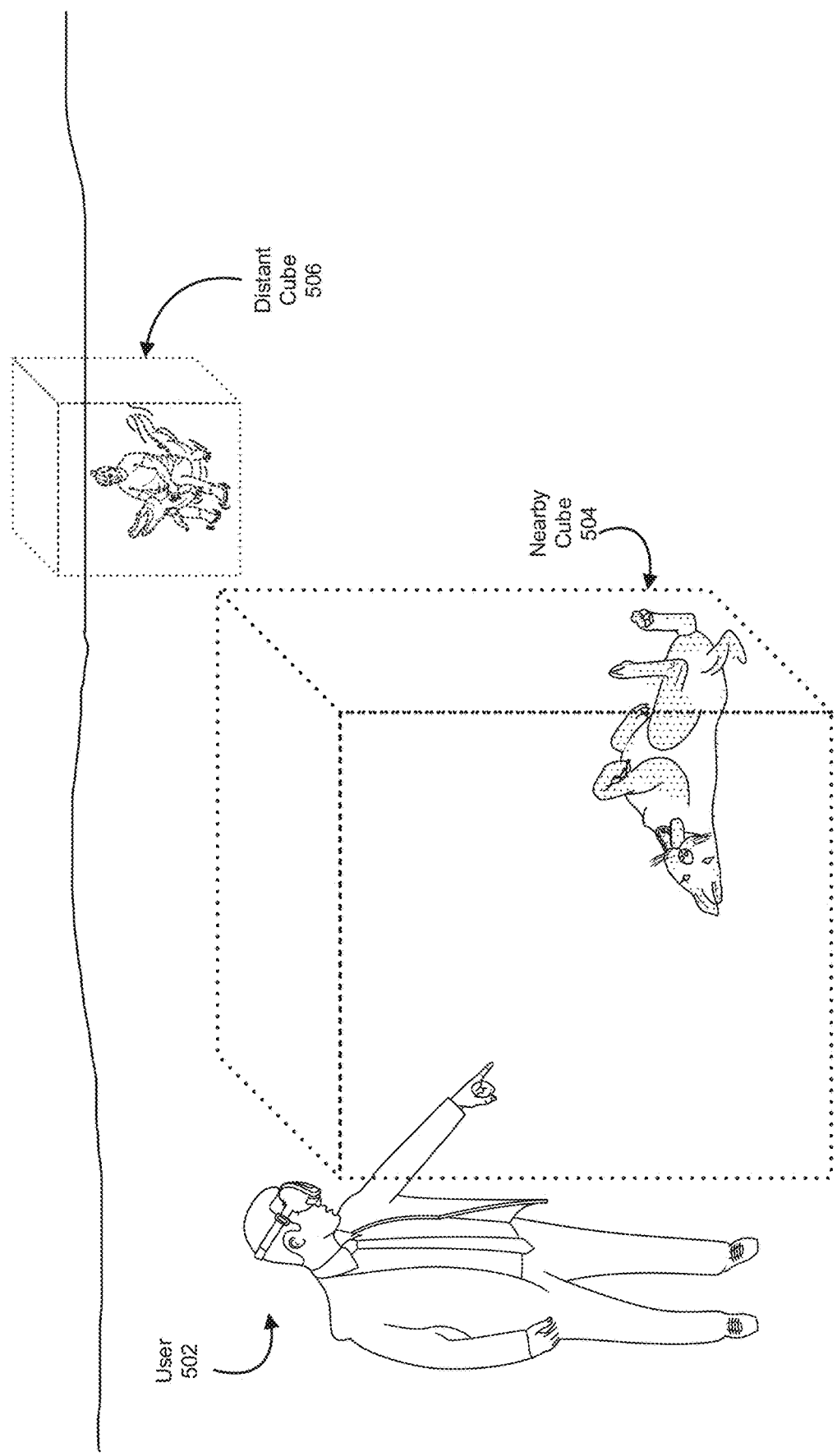
FIG. 5 is an illustration of an additional exemplary augmented reality environment.

In some embodiments, the systems described herein may determine a viewing distance of the expected physical space relative to a position of the user within the AR environment and specify a quality of the volumetric data file that is correlated to the viewing distance such that a larger, higher-viewing-quality file is correlated with a nearer viewing distance and a smaller, lower-viewing-quality file is correlated with a farther viewing distance. For example, as illustrated in FIG. 5, the systems described herein may detect a user 502 in an AR environment. In one embodiment, a nearby cube 504 may be immediately adjacent to user 502 and the systems described herein may download nearby cube 504 at a maximum level of detail. For example, if nearby cube 504 includes a dog, the systems described herein may download and render the details of the dog's fur and/or the sound of the dog panting.

In one example, the systems described herein may detect that a distant cube 506 is within view of user 502 but is far enough away (e.g., fifty meters away, one hundred meters away, etc.) that user 502 may be unable to perceive fine details. In some embodiments, the systems described herein may download a lower-quality version of cube 506 that does not include all of the data that would be included in a higher-quality version. For example, if cube 506 includes a man wrestling an alligator, the systems described herein may not download or render the fine details of the alligator wrestling such as the scales on the alligator's back, the individual hairs on the man's head, or the quiet sounds of the alligator's claws scrabbling in the dirt. Additionally or alternatively, if the cubes contain light field information, each cube may contain all of the information sufficient to display anything visible to the viewer from within the cube. In this embodiment, a cube may include detailed information about nearby objects or terrain and less detailed information about distant objects or terrain.

In some embodiments, the systems described herein may determine that the viewing distance has decreased and, in response to determining that the viewing distance has decreased, download a higher quality version of the volumetric data file. For example, if user 502 approaches the physical space represented by cube 506, the systems described herein may download a higher-quality version of cube 506 that includes the details omitted earlier.

Figure 6:
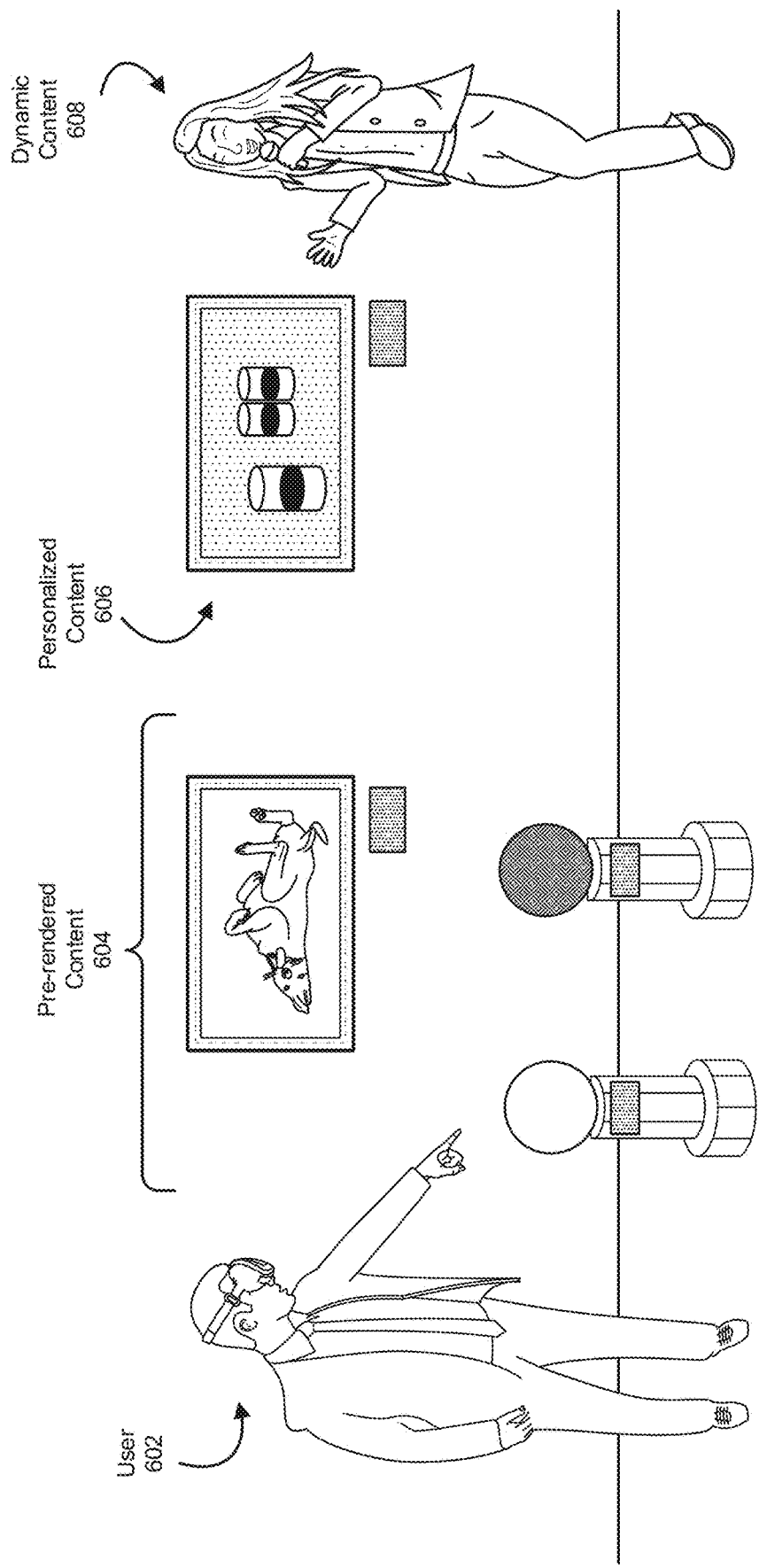
FIG. 6 is an illustration of an additional exemplary augmented reality environment.

In some embodiments, volumetric data files may include a mix of pre-rendered static content and dynamic and/or personalized content. For example, as illustrated in FIG. 6, a user 602 may explore an AR environment of a museum. In one example, volumetric data files representing physical spaces within the museum may include pre-rendered content 604, such as paintings, statues, and other art objects.

In some examples, a volumetric data file may include personalized content 606. In one embodiment, personalized content 606 may be stored in the volumetric data file as a blank canvas within a frame and the systems described herein may fill the blank canvas with personalized content, such as an advertisement for a soft drink. In some embodiments, the systems described herein may determine what personalized content may be relevant to a user based on data stored about the user (e.g., demographics, activity, linked profiles, etc.) while in other embodiments, the systems described herein may receive personalized content recommendations from another application or module.

In some embodiments, a volumetric data file may include dynamic content 608 that is triggered when a user enters a physical space and/or interacts with a physical space in some way. For example, when user 602 enters a designated location with an AR museum environment, a virtual tour guide may appear and give descriptions of the art objects in the location. As user 602 moves throughout the museum, the virtual tour guide may move with the user, describing the content in each physical space. In some examples, dynamic content 608 may be pre-recorded to play when user 602 interacts with a trigger. In other examples, dynamic content 608 may include live (i.e., real-time) content being streamed by the AR system. For example, dynamic content 608 may include a celebrity giving a live tour of the museum. In some examples, the systems described herein may record live content for later playback. For example, the systems described herein may play a recorded version of the celebrity museum tour at a later time. In another example, an AR environment may include a famous person's living room and live content within the AR environment may include a live sporting event playing on the television in the living room.

As described above, the systems and methods described herein may predictively download volumetric data to an AR device such as a headset in order to minimize the delay in presenting an AR environment to a user despite the constraints of limited data storage on AR endpoint devices. In some examples, the systems described herein may preemptively download data that the user is expected to interact with in the near future, such as data describing rooms that the user may be about to enter or directions in which the user may be about to look. In some embodiments, the systems described herein may mix pre-rendered and personalized data as well as static and dynamic data to provide a user with an immersive, efficient AR experience.

Embodiments of the present disclosure may include or be implemented in conjunction with various types of artificial reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs). Other artificial reality systems may include an NED that also provides visibility into the real world (such as, e.g., augmented-reality system 700 in FIG. 7) or that visually immerses a user in an artificial reality (such as, e.g., virtual-reality system 800 in FIG. 8). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 7:
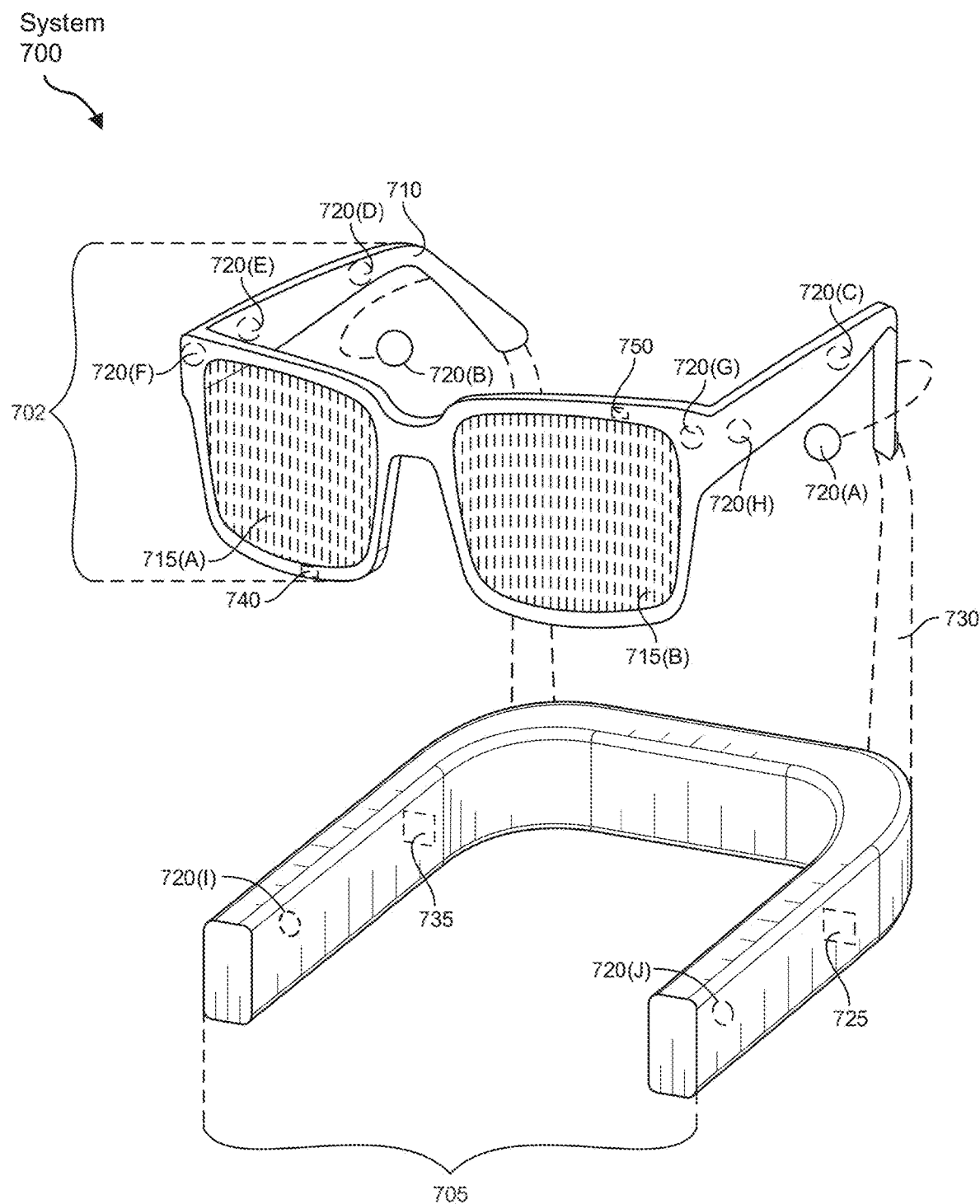
FIG. 7 is an illustration of exemplary augmented-reality glasses that may be used in connection with embodiments of this disclosure.
Figure 8:
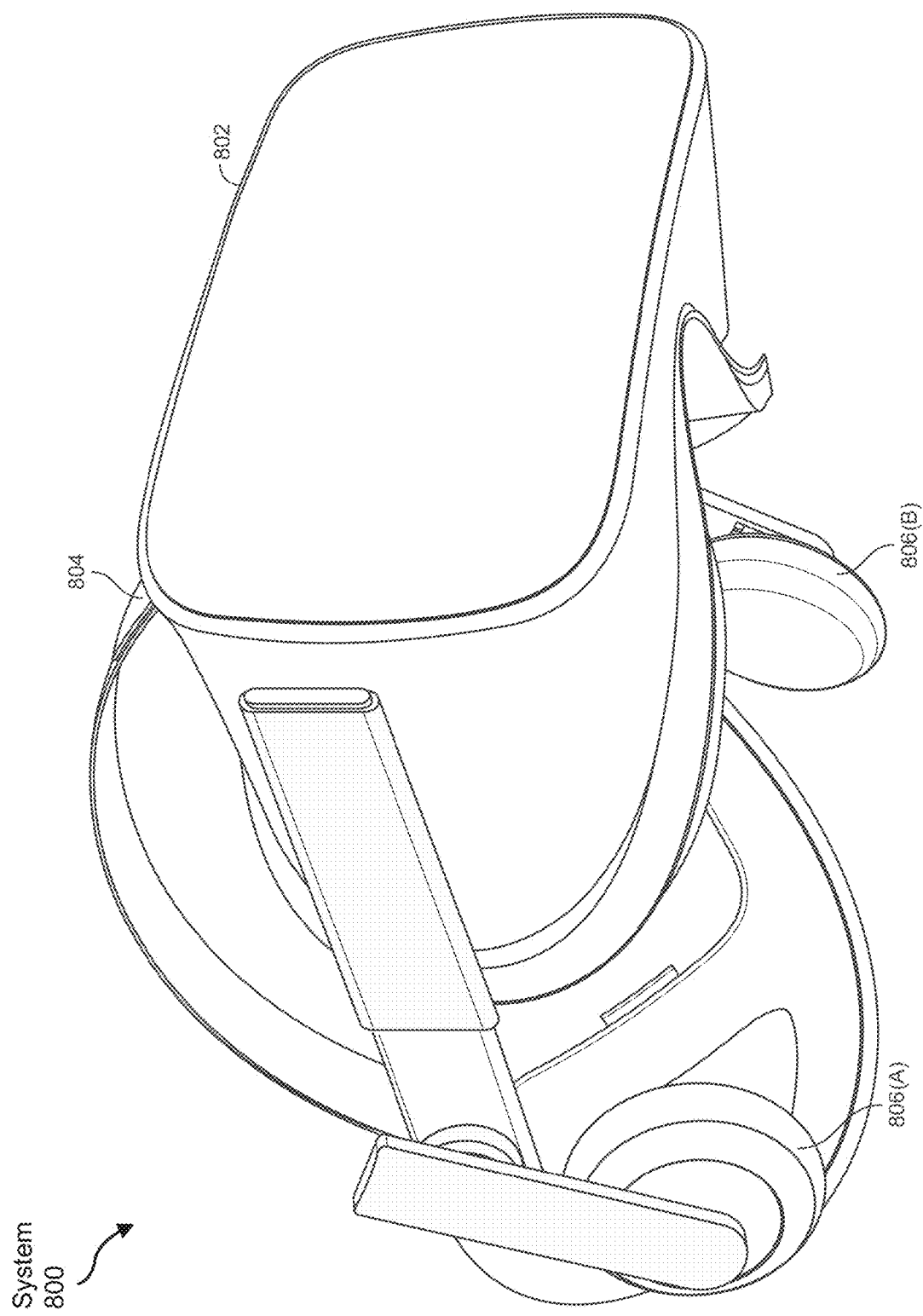
FIG. 8 is an illustration of an exemplary virtual-reality headset that may be used in connection with embodiments of this disclosure.

Turning to FIG. 7, augmented-reality system 700 may include an eyewear device 702 with a frame 710 configured to hold a left display device 715(A) and a right display device 715(B) in front of a user's eyes. Display devices 715(A) and 715(B) may act together or independently to present an image or series of images to a user. While augmented-reality system 700 includes two displays, embodiments of this disclosure may be implemented in augmented-reality systems with a single NED or more than two NEDs.

In some embodiments, augmented-reality system 700 may include one or more sensors, such as sensor 740. Sensor 740 may generate measurement signals in response to motion of augmented-reality system 700 and may be located on substantially any portion of frame 710. Sensor 740 may represent one or more of a variety of different sensing mechanisms, such as a position sensor, an inertial measurement unit (IMU), a depth camera assembly, a structured light emitter and/or detector, or any combination thereof. In some embodiments, augmented-reality system 700 may or may not include sensor 740 or may include more than one sensor. In embodiments in which sensor 740 includes an IMU, the IMU may generate calibration data based on measurement signals from sensor 740. Examples of sensor 740 may include, without limitation, accelerometers, gyroscopes, magnetometers, other suitable types of sensors that detect motion, sensors used for error correction of the IMU, or some combination thereof.

In some examples, augmented-reality system 700 may also include a microphone array with a plurality of acoustic transducers 720(A)-120(J), referred to collectively as acoustic transducers 720. Acoustic transducers 720 may represent transducers that detect air pressure variations induced by sound waves. Each acoustic transducer 720 may be configured to detect sound and convert the detected sound into an electronic format (e.g., an analog or digital format). The microphone array in FIG. 7 may include, for example, ten acoustic transducers: 720(A) and 720(B), which may be designed to be placed inside a corresponding ear of the user, acoustic transducers 720(C), 720(D), 720(E), 720(F), 720(G), and 720(H), which may be positioned at various locations on frame 710, and/or acoustic transducers 720(1) and 720(J), which may be positioned on a corresponding neckband 705.

In some embodiments, one or more of acoustic transducers 720(A)-(J) may be used as output transducers (e.g., speakers). For example, acoustic transducers 720(A) and/or 720(B) may be earbuds or any other suitable type of headphone or speaker.

The configuration of acoustic transducers 720 of the microphone array may vary. While augmented-reality system 700 is shown in FIG. 7 as having ten acoustic transducers 720, the number of acoustic transducers 720 may be greater or less than ten. In some embodiments, using higher numbers of acoustic transducers 720 may increase the amount of audio information collected and/or the sensitivity and accuracy of the audio information. In contrast, using a lower number of acoustic transducers 720 may decrease the computing power required by an associated controller 750 to process the collected audio information. In addition, the position of each acoustic transducer 720 of the microphone array may vary. For example, the position of an acoustic transducer 720 may include a defined position on the user, a defined coordinate on frame 710, an orientation associated with each acoustic transducer 720, or some combination thereof.

Acoustic transducers 720(A) and 720(B) may be positioned on different parts of the user's ear, such as behind the pinna, behind the tragus, and/or within the auricle or fossa. Or, there may be additional acoustic transducers 720 on or surrounding the ear in addition to acoustic transducers 720 inside the ear canal. Having an acoustic transducer 720 positioned next to an ear canal of a user may enable the microphone array to collect information on how sounds arrive at the ear canal. By positioning at least two of acoustic transducers 720 on either side of a user's head (e.g., as binaural microphones), augmented-reality device 700 may simulate binaural hearing and capture a 4D stereo sound field around about a user's head. In some embodiments, acoustic transducers 720(A) and 720(B) may be connected to augmented-reality system 700 via a wired connection 730, and in other embodiments acoustic transducers 720(A) and 720(B) may be connected to augmented-reality system 700 via a wireless connection (e.g., a BLUETOOTH connection). In still other embodiments, acoustic transducers 720(A) and 720(B) may not be used at all in conjunction with augmented-reality system 700.

Acoustic transducers 720 on frame 710 may be positioned in a variety of different ways, including along the length of the temples, across the bridge, above or below display devices 715(A) and 715(B), or some combination thereof. Acoustic transducers 720 may also be oriented such that the microphone array is able to detect sounds in a wide range of directions surrounding the user wearing the augmented-reality system 700. In some embodiments, an optimization process may be performed during manufacturing of augmented-reality system 700 to determine relative positioning of each acoustic transducer 720 in the microphone array.

In some examples, augmented-reality system 700 may include or be connected to an external device (e.g., a paired device), such as neckband 705. Neckband 705 generally represents any type or form of paired device. Thus, the following discussion of neckband 705 may also apply to various other paired devices, such as charging cases, smart watches, smart phones, wrist bands, other wearable devices, hand-held controllers, tablet computers, laptop computers, other external compute devices, etc.

As shown, neckband 705 may be coupled to eyewear device 702 via one or more connectors. The connectors may be wired or wireless and may include electrical and/or non-electrical (e.g., structural) components. In some cases, eyewear device 702 and neckband 705 may operate independently without any wired or wireless connection between them. While FIG. 7 illustrates the components of eyewear device 702 and neckband 705 in example locations on eyewear device 702 and neckband 705, the components may be located elsewhere and/or distributed differently on eyewear device 702 and/or neckband 705. In some embodiments, the components of eyewear device 702 and neckband 705 may be located on one or more additional peripheral devices paired with eyewear device 702, neckband 705, or some combination thereof.

Pairing external devices, such as neckband 705, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 700 may be provided by a paired device or shared between a paired device and an eyewear device, thus reducing the weight, heat profile, and form factor of the eyewear device overall while still retaining desired functionality. For example, neckband 705 may allow components that would otherwise be included on an eyewear device to be included in neckband 705 since users may tolerate a heavier weight load on their shoulders than they would tolerate on their heads. Neckband 705 may also have a larger surface area over which to diffuse and disperse heat to the ambient environment. Thus, neckband 705 may allow for greater battery and computation capacity than might otherwise have been possible on a stand-alone eyewear device. Since weight carried in neckband 705 may be less invasive to a user than weight carried in eyewear device 702, a user may tolerate wearing a lighter eyewear device and carrying or wearing the paired device for greater lengths of time than a user would tolerate wearing a heavy standalone eyewear device, thereby enabling users to more fully incorporate artificial reality environments into their day-to-day activities.

Neckband 705 may be communicatively coupled with eyewear device 702 and/or to other devices. These other devices may provide certain functions (e.g., tracking, localizing, depth mapping, processing, storage, etc.) to augmented-reality system 700. In the embodiment of FIG. 7, neckband 705 may include two acoustic transducers (e.g., 720(1) and 720(J)) that are part of the microphone array (or potentially form their own microphone subarray). Neckband 705 may also include a controller 725 and a power source 735.

Acoustic transducers 720(1) and 720(J) of neckband 705 may be configured to detect sound and convert the detected sound into an electronic format (analog or digital). In the embodiment of FIG. 7, acoustic transducers 720(1) and 720(J) may be positioned on neckband 705, thereby increasing the distance between the neckband acoustic transducers 720(1) and 720(J) and other acoustic transducers 720 positioned on eyewear device 702. In some cases, increasing the distance between acoustic transducers 720 of the microphone array may improve the accuracy of beamforming performed via the microphone array. For example, if a sound is detected by acoustic transducers 720(C) and 720(D) and the distance between acoustic transducers 720(C) and 720 (D) is greater than, e.g., the distance between acoustic transducers 720(D) and 720(E), the determined source location of the detected sound may be more accurate than if the sound had been detected by acoustic transducers 720(D) and 720(E).

Controller 725 of neckband 705 may process information generated by the sensors on neckband 705 and/or augmented-reality system 700. For example, controller 725 may process information from the microphone array that describes sounds detected by the microphone array. For each detected sound, controller 725 may perform a direction-of-arrival (DOA) estimation to estimate a direction from which the detected sound arrived at the microphone array. As the microphone array detects sounds, controller 725 may populate an audio data set with the information. In embodiments in which augmented-reality system 700 includes an inertial measurement unit, controller 725 may compute all inertial and spatial calculations from the IMU located on eyewear device 702. A connector may convey information between augmented-reality system 700 and neckband 705 and between augmented-reality system 700 and controller 725. The information may be in the form of optical data, electrical data, wireless data, or any other transmittable data form. Moving the processing of information generated by augmented-reality system 700 to neckband 705 may reduce weight and heat in eyewear device 702, making it more comfortable to the user.

Power source 735 in neckband 705 may provide power to eyewear device 702 and/or to neckband 705. Power source 735 may include, without limitation, lithium ion batteries, lithium-polymer batteries, primary lithium batteries, alkaline batteries, or any other form of power storage. In some cases, power source 735 may be a wired power source. Including power source 735 on neckband 705 instead of on eyewear device 702 may help better distribute the weight and heat generated by power source 735.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 800 in FIG. 8, that mostly or completely covers a user's field of view. Virtual-reality system 800 may include a front rigid body 802 and a band 804 shaped to fit around a user's head. Virtual-reality system 800 may also include output audio transducers 806(A) and 806(B). Furthermore, while not shown in FIG. 8, front rigid body 802 may include one or more electronic elements, including one or more electronic displays, one or more inertial measurement units (IMUS), one or more tracking emitters or detectors, and/or any other suitable device or system for creating an artificial-reality experience.

Artificial reality systems may include a variety of types of visual feedback mechanisms. For example, display devices in augmented-reality system 700 and/or virtual-reality system 800 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial reality systems may include a single display screen for both eyes or may provide a display screen for each eye, which may allow for additional flexibility for varifocal adjustments or for correcting a user's refractive error. Some of these artificial reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial reality systems described herein may include one or more projection systems. For example, display devices in augmented-reality system 700 and/or virtual-reality system 800 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial reality systems may also be configured with any other suitable type or form of image projection system, such as retinal projectors used in virtual retina displays.

The artificial reality systems described herein may also include various types of computer vision components and subsystems. For example, augmented-reality system 700 and/or virtual-reality system 800 may include one or more optical sensors, such as two-dimensional (2D) or 4D cameras, structured light transmitters and detectors, time-of-flight depth sensors, single-beam or sweeping laser rangefinders, 4D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

The artificial reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial reality experience in one or more of these contexts and environments and/or in other contexts and environments.

When the user is wearing an augmented-reality headset or virtual-reality headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to as "localization," and the process of rendering playback of the audio source signal to appear as if it is coming from a specific direction may be referred to as "spatialization."

Localizing an audio source may be performed in a variety of different ways. In some cases, an augmented-reality or virtual-reality headset may initiate a DOA analysis to determine the location of a sound source. The DOA analysis may include analyzing the intensity, spectra, and/or arrival time of each sound at the artificial-reality device to determine the direction from which the sounds originated. The DOA analysis may include any suitable algorithm for analyzing the surrounding acoustic environment in which the artificial-reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial-reality device may provide an alignment and orientation guide, which the user may follow to customize the sound signal presented to the user based on their unique HRTF. In some embodiments, an artificial-reality device may implement one or more microphones to listen to sounds within the user's environment. The augmented-reality or virtual-reality headset may use a variety of different array transfer functions (e.g., any of the DOA algorithms identified above) to estimate the direction of arrival for the sounds. Once the direction of arrival has been determined, the artificial-reality device may play back sounds to the user according to the user's unique HRTF. Accordingly, the DOA estimation generated using the array transfer function (ATF) may be used to determine the direction from which the sounds are to be played from. The playback sounds may be further refined based on how that specific user hears sounds according to the HRTF.

In addition to or as an alternative to performing a DOA estimation, an artificial-reality device may perform localization based on information received from other types of sensors. These sensors may include cameras, IR sensors, heat sensors, motion sensors, GPS receivers, or in some cases, sensors that detect a user's eye movements. For example, as noted above, an artificial-reality device may include an eye tracker or gaze detector that determines where the user is looking. Often, the user's eyes will look at the source of the sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an "acoustic transfer function" may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial-reality device may include one or more acoustic sensors that detect sounds within range of the device. A controller of the artificial-reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial-reality device may re-render (i.e., spatialize) the sound signals to sound as if coming from the direction of that sound source. The artificial-reality device may apply filters or other digital signal processing that alter the intensity, spectra, or arrival time of the sound signal. The digital signal processing may be applied in such a way that the sound signal is perceived as originating from the determined location. The artificial-reality device may amplify or subdue certain frequencies or change the time that the signal arrives at each ear. In some cases, the artificial-reality device may create an acoustic transfer function that is specific to the location of the device and the detected direction of arrival of the sound signal. In some embodiments, the artificial-reality device may re-render the source signal in a stereo device or multi-speaker device (e.g., a surround sound device). In such cases, separate and distinct audio signals may be sent to each speaker. Each of these audio signals may be altered according to the user's HRTF and according to measurements of the user's location and the location of the sound source to sound as if they are coming from the determined location of the sound source. Accordingly, in this manner, the artificial-reality device (or speakers associated with the device) may re-render an audio signal to sound as if originating from a specific location.

In some embodiments, the systems described herein may also include an eye-tracking subsystem designed to identify and track various characteristics of a user's eye(s), such as the user's gaze direction. The phrase "eye tracking" may, in some examples, refer to a process by which the position, orientation, and/or motion of an eye is measured, detected, sensed, determined, and/or monitored. The disclosed systems may measure the position, orientation, and/or motion of an eye in a variety of different ways, including through the use of various optical-based eye-tracking techniques, ultrasound-based eye-tracking techniques, etc. An eye-tracking subsystem may be configured in a number of different ways and may include a variety of different eye-tracking hardware components or other computer-vision components. For example, an eye-tracking subsystem may include a variety of different optical sensors, such as two-dimensional (2D) or 4D cameras, time-of-flight depth sensors, single-beam or sweeping laser rangefinders, 4D LiDAR sensors, and/or any other suitable type or form of optical sensor. In this example, a processing subsystem may process data from one or more of these sensors to measure, detect, determine, and/or otherwise monitor the position, orientation, and/or motion of the user's eye(s).

Figure 9:
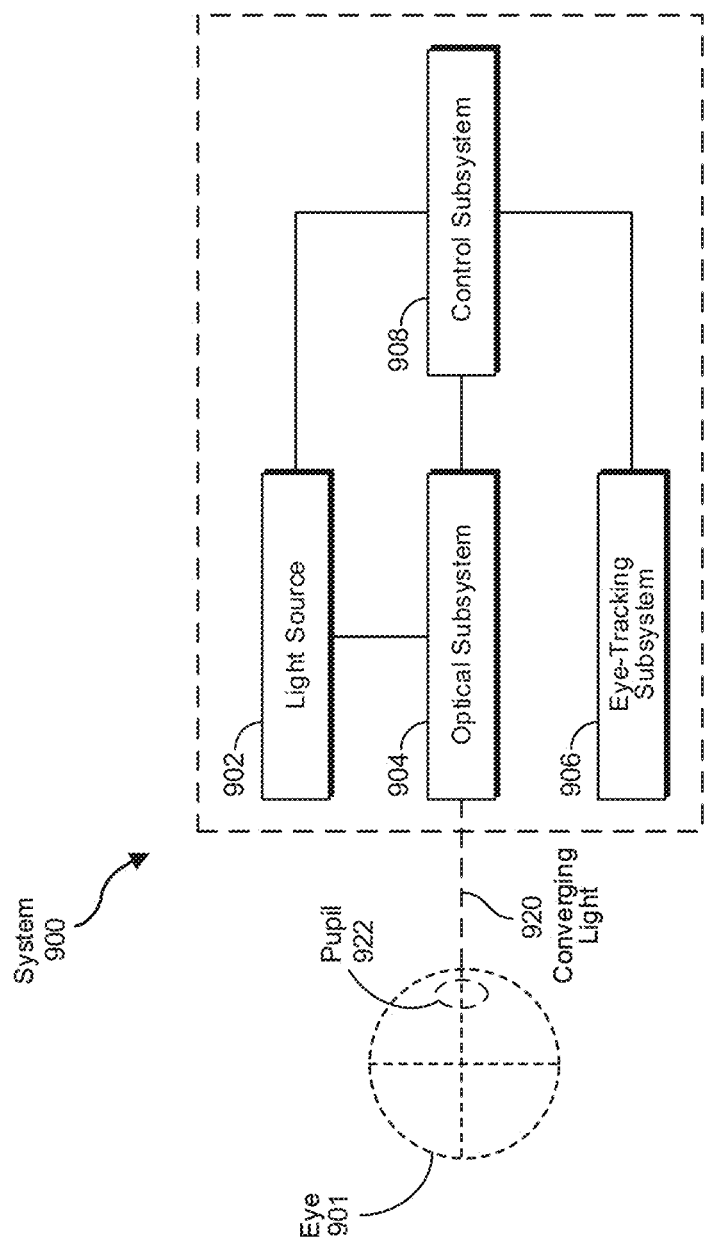
FIG. 9 an illustration of an exemplary system that incorporates an eye-tracking subsystem capable of tracking a user's eye(s).

FIG. 9 is an illustration of an exemplary system 900 that incorporates an eye-tracking subsystem capable of tracking a user's eye(s). As depicted in FIG. 9, system 900 may include a light source 902, an optical subsystem 904, an eye-tracking subsystem 906, and/or a control subsystem 908. In some examples, light source 902 may generate light for an image (e.g., to be presented to an eye 901 of the viewer). Light source 902 may represent any of a variety of suitable devices. For example, light source 902 can include a two-dimensional projector (e.g., a LCoS display), a scanning source (e.g., a scanning laser), or other device (e.g., an LCD, an LED display, an OLED display, an active-matrix OLED display (AMOLED), a transparent OLED display (TOLED), a waveguide, or some other display capable of generating light for presenting an image to the viewer). In some examples, the image may represent a virtual image, which may refer to an optical image formed from the apparent divergence of light rays from a point in space, as opposed to an image formed from the light ray's actual divergence.

In some embodiments, optical subsystem 904 may receive the light generated by light source 902 and generate, based on the received light, converging light 920 that includes the image. In some examples, optical subsystem 904 may include any number of lenses (e.g., Fresnel lenses, convex lenses, concave lenses), apertures, filters, mirrors, prisms, and/or other optical components, possibly in combination with actuators and/or other devices. In particular, the actuators and/or other devices may translate and/or rotate one or more of the optical components to alter one or more aspects of converging light 920. Further, various mechanical couplings may serve to maintain the relative spacing and/or the orientation of the optical components in any suitable combination.

In one embodiment, eye-tracking subsystem 906 may generate tracking information indicating a gaze angle of an eye 901 of the viewer. In this embodiment, control subsystem 908 may control aspects of optical subsystem 904 (e.g., the angle of incidence of converging light 920) based at least in part on this tracking information. Additionally, in some examples, control subsystem 908 may store and utilize historical tracking information (e.g., a history of the tracking information over a given duration, such as the previous second or fraction thereof) to anticipate the gaze angle of eye 901 (e.g., an angle between the visual axis and the anatomical axis of eye 901). In some embodiments, eye-tracking subsystem 906 may detect radiation emanating from some portion of eye 901 (e.g., the cornea, the iris, the pupil, or the like) to determine the current gaze angle of eye 901. In other examples, eye-tracking subsystem 906 may employ a wavefront sensor to track the current location of the pupil.

Any number of techniques can be used to track eye 901. Some techniques may involve illuminating eye 901 with infrared light and measuring reflections with at least one optical sensor that is tuned to be sensitive to the infrared light. Information about how the infrared light is reflected from eye 901 may be analyzed to determine the position(s), orientation(s), and/or motion(s) of one or more eye feature (s), such as the cornea, pupil, iris, and/or retinal blood vessels.

In some examples, the radiation captured by a sensor of eye-tracking subsystem 906 may be digitized (i.e., converted to an electronic signal). Further, the sensor may transmit a digital representation of this electronic signal to one or more processors (for example, processors associated with a device including eye-tracking subsystem 906). Eye-tracking subsystem 906 may include any of a variety of sensors in a variety of different configurations. For example, eye-tracking subsystem 906 may include an infrared detector that reacts to infrared radiation. The infrared detector may be a thermal detector, a photonic detector, and/or any other suitable type of detector. Thermal detectors may include detectors that react to thermal effects of the incident infrared radiation.

In some examples, one or more processors may process the digital representation generated by the sensor(s) of eye-tracking subsystem 906 to track the movement of eye 901. In another example, these processors may track the movements of eye 901 by executing algorithms represented by computer-executable instructions stored on non-transitory memory. In some examples, on-chip logic (e.g., an application-specific integrated circuit or ASIC) may be used to perform at least portions of such algorithms. As noted, eye-tracking subsystem 906 may be programmed to use an output of the sensor(s) to track movement of eye 901. In some embodiments, eye-tracking subsystem 906 may analyze the digital representation generated by the sensors to extract eye rotation information from changes in reflections. In one embodiment, eye-tracking subsystem 906 may use corneal reflections or glints (also known as Purkinje images) and/or the center of the eye's pupil 922 as features to track over time.

In some embodiments, eye-tracking subsystem 906 may use the center of the eye's pupil 922 and infrared or near-infrared, non-collimated light to create corneal reflections. In these embodiments, eye-tracking subsystem 906 may use the vector between the center of the eye's pupil 922 and the corneal reflections to compute the gaze direction of eye 901. In some embodiments, the disclosed systems may perform a calibration procedure for an individual (using, e.g., supervised or unsupervised techniques) before tracking the user's eyes. For example, the calibration procedure may include directing users to look at one or more points displayed on a display while the eye-tracking system records the values that correspond to each gaze position associated with each point.

In some embodiments, eye-tracking subsystem 906 may use two types of infrared and/or near-infrared (also known as active light) eye-tracking techniques: bright-pupil and dark-pupil eye tracking, which may be differentiated based on the location of an illumination source with respect to the optical elements used. If the illumination is coaxial with the optical path, then eye 901 may act as a retroreflector as the light reflects off the retina, thereby creating a bright pupil effect similar to a red-eye effect in photography. If the illumination source is offset from the optical path, then the eye's pupil 922 may appear dark because the retroreflection from the retina is directed away from the sensor. In some embodiments, bright-pupil tracking may create greater iris/pupil contrast, allowing more robust eye tracking with iris pigmentation, and may feature reduced interference (e.g., interference caused by eyelashes and other obscuring features). Bright-pupil tracking may also allow tracking in lighting conditions ranging from total darkness to a very bright environment.

In some embodiments, control subsystem 908 may control light source 902 and/or optical subsystem 904 to reduce optical aberrations (e.g., chromatic aberrations and/or monochromatic aberrations) of the image that may be caused by or influenced by eye 901. In some examples, as mentioned above, control subsystem 908 may use the tracking information from eye-tracking subsystem 906 to perform such control. For example, in controlling light source 902, control subsystem 908 may alter the light generated by light source 902 (e.g., by way of image rendering) to modify (e.g., pre-distort) the image so that the aberration of the image caused by eye 901 is reduced.

The disclosed systems may track both the position and relative size of the pupil (since, e.g., the pupil dilates and/or contracts). In some examples, the eye-tracking devices and components (e.g., sensors and/or sources) used for detecting and/or tracking the pupil may be different (or calibrated differently) for different types of eyes. For example, the frequency range of the sensors may be different (or separately calibrated) for eyes of different colors and/or different pupil types, sizes, and/or the like. As such, the various eye-tracking components (e.g., infrared sources and/or sensors) described herein may need to be calibrated for each individual user and/or eye.

The disclosed systems may track both eyes with and without ophthalmic correction, such as that provided by contact lenses worn by the user. In some embodiments, ophthalmic correction elements (e.g., adjustable lenses) may be directly incorporated into the artificial reality systems described herein. In some examples, the color of the user's eye may necessitate modification of a corresponding eye-tracking algorithm. For example, eye-tracking algorithms may need to be modified based at least in part on the differing color contrast between a brown eye and, for example, a blue eye.

Figure 10:
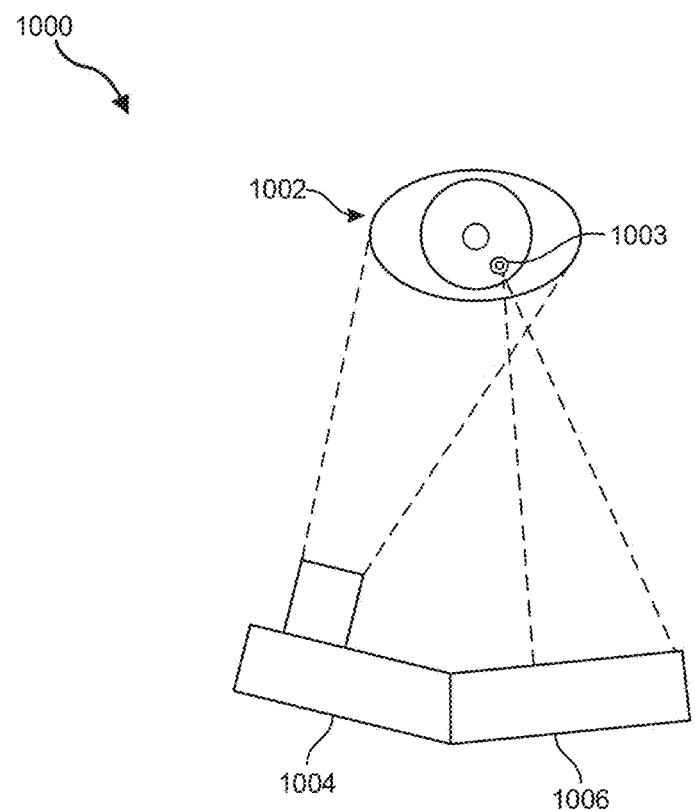
FIG. 10 is a more detailed illustration of various aspects of the eye-tracking subsystem illustrated in FIG. 9.
Figure 10:
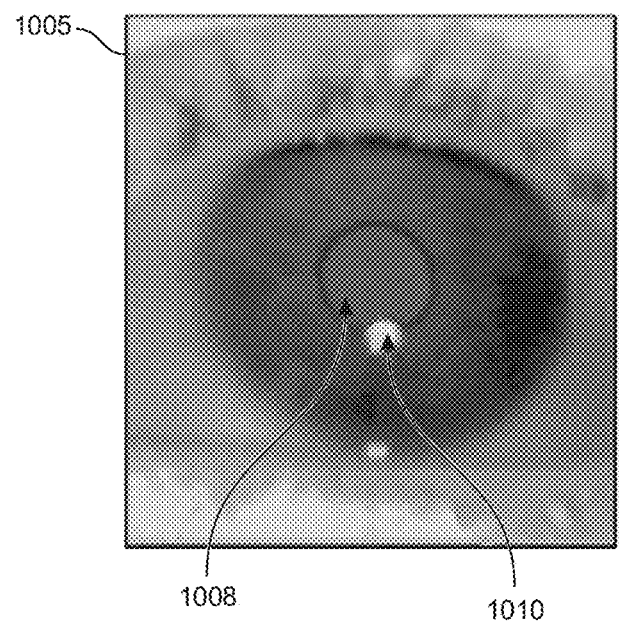

FIG. 10 is a more detailed illustration of various aspects of the eye-tracking subsystem illustrated in FIG. 9. As shown in this figure, an eye-tracking subsystem 1000 may include at least one source 1004 and at least one sensor 1006. Source 1004 generally represents any type or form of element capable of emitting radiation. In one example, source 1004 may generate visible, infrared, and/or near-infrared radiation. In some examples, source 1004 may radiate non-collimated infrared and/or near-infrared portions of the electromagnetic spectrum towards an eye 1002 of a user. Source 1004 may utilize a variety of sampling rates and speeds. For example, the disclosed systems may use sources with higher sampling rates in order to capture fixational eye movements of a user's eye 1002 and/or to correctly measure saccade dynamics of the user's eye 1002. As noted above, any type or form of eye-tracking technique may be used to track the user's eye 1002, including optical-based eye-tracking techniques, ultrasound-based eye-tracking techniques, etc.

Sensor 1006 generally represents any type or form of element capable of detecting radiation, such as radiation reflected off the user's eye 1002. Examples of sensor 1006 include, without limitation, a charge coupled device (CCD), a photodiode array, a complementary metal-oxide-semiconductor (CMOS) based sensor device, and/or the like. In one example, sensor 1006 may represent a sensor having predetermined parameters, including, but not limited to, a dynamic resolution range, linearity, and/or other characteristic selected and/or designed specifically for eye tracking.

As detailed above, eye-tracking subsystem 1000 may generate one or more glints. As detailed above, a glint 1003 may represent reflections of radiation (e.g., infrared radiation from an infrared source, such as source 1004) from the structure of the user's eye. In various embodiments, glint 1003 and/or the user's pupil may be tracked using an eye-tracking algorithm executed by a processor (either within or external to an artificial reality device). For example, an artificial reality device may include a processor and/or a memory device in order to perform eye tracking locally and/or a transceiver to send and receive the data necessary to perform eye tracking on an external device (e.g., a mobile phone, cloud server, or other computing device).

FIG. 10 shows an example image 1005 captured by an eye-tracking subsystem, such as eye-tracking subsystem 1000. In this example, image 1005 may include both the user's pupil 1008 and a glint 1010 near the same. In some examples, pupil 1008 and/or glint 1010 may be identified using an artificial-intelligence-based algorithm, such as a computer-vision-based algorithm. In one embodiment, image 1005 may represent a single frame in a series of frames that may be analyzed continuously in order to track the eye 1002 of the user. Further, pupil 1008 and/or glint 1010 may be tracked over a period of time to determine a user's gaze.

In one example, eye-tracking subsystem 1000 may be configured to identify and measure the inter-pupillary distance (IPD) of a user. In some embodiments, eye-tracking subsystem 1000 may measure and/or calculate the IPD of the user while the user is wearing the artificial reality system. In these embodiments, eye-tracking subsystem 1000 may detect the positions of a user's eyes and may use this information to calculate the user's IPD.

As noted, the eye-tracking systems or subsystems disclosed herein may track a user's eye position and/or eye movement in a variety of ways. In one example, one or more light sources and/or optical sensors may capture an image of the user's eyes. The eye-tracking subsystem may then use the captured information to determine the user's inter-pupillary distance, interocular distance, and/or a 4D position of each eye (e.g., for distortion adjustment purposes), including a magnitude of torsion and rotation (i.e., roll, pitch, and yaw) and/or gaze directions for each eye. In one example, infrared light may be emitted by the eye-tracking subsystem and reflected from each eye. The reflected light may be received or detected by an optical sensor and analyzed to extract eye rotation data from changes in the infrared light reflected by each eye.

The eye-tracking subsystem may use any of a variety of different methods to track the eyes of a user. For example, a light source (e.g., infrared light-emitting diodes) may emit a dot pattern onto each eye of the user. The eye-tracking subsystem may then detect (e.g., via an optical sensor coupled to the artificial reality system) and analyze a reflection of the dot pattern from each eye of the user to identify a location of each pupil of the user. Accordingly, the eye-tracking subsystem may track up to six degrees of freedom of each eye (i.e., 4D position, roll, pitch, and yaw) and at least a subset of the tracked quantities may be combined from two eyes of a user to estimate a gaze point (i.e., a 4D location or position in a virtual scene where the user is looking) and/or an IPD.

In some cases, the distance between a user's pupil and a display may change as the user's eye moves to look in different directions. The varying distance between a pupil and a display as viewing direction changes may be referred to as "pupil swim" and may contribute to distortion perceived by the user as a result of light focusing in different locations as the distance between the pupil and the display changes. Accordingly, measuring distortion at different eye positions and pupil distances relative to displays and generating distortion corrections for different positions and distances may allow mitigation of distortion caused by pupil swim by tracking the 4D position of a user's eyes and applying a distortion correction corresponding to the 4D position of each of the user's eyes at a given point in time. Thus, knowing the 4D position of each of a user's eyes may allow for the mitigation of distortion caused by changes in the distance between the pupil of the eye and the display by applying a distortion correction for each 4D eye position. Furthermore, as noted above, knowing the position of each of the user's eyes may also enable the eye-tracking subsystem to make automated adjustments for a user's IPD.

In some embodiments, a display subsystem may include a variety of additional subsystems that may work in conjunction with the eye-tracking subsystems described herein. For example, a display subsystem may include a varifocal subsystem, a scene-rendering module, and/or a vergence-processing module. The varifocal subsystem may cause left and right display elements to vary the focal distance of the display device. In one embodiment, the varifocal subsystem may physically change the distance between a display and the optics through which it is viewed by moving the display, the optics, or both. Additionally, moving or translating two lenses relative to each other may also be used to change the focal distance of the display. Thus, the varifocal subsystem may include actuators or motors that move displays and/or optics to change the distance between them. This varifocal subsystem may be separate from or integrated into the display subsystem. The varifocal subsystem may also be integrated into or separate from its actuation subsystem and/or the eye-tracking subsystems described herein.

In one example, the display subsystem may include a vergence-processing module configured to determine a vergence depth of a user's gaze based on a gaze point and/or an estimated intersection of the gaze lines determined by the eye-tracking subsystem. Vergence may refer to the simultaneous movement or rotation of both eyes in opposite directions to maintain single binocular vision, which may be naturally and automatically performed by the human eye. Thus, a location where a user's eyes are verged is where the user is looking and is also typically the location where the user's eyes are focused. For example, the vergence-processing module may triangulate gaze lines to estimate a distance or depth from the user associated with intersection of the gaze lines. The depth associated with intersection of the gaze lines may then be used as an approximation for the accommodation distance, which may identify a distance from the user where the user's eyes are directed. Thus, the vergence distance may allow for the determination of a location where the user's eyes should be focused and a depth from the user's eyes at which the eyes are focused, thereby providing information (such as an object or plane of focus) for rendering adjustments to the virtual scene.

The vergence-processing module may coordinate with the eye-tracking subsystems described herein to make adjustments to the display subsystem to account for a user's vergence depth. When the user is focused on something at a distance, the user's pupils may be slightly farther apart than when the user is focused on something close. The eye-tracking subsystem may obtain information about the user's vergence or focus depth and may adjust the display subsystem to be closer together when the user's eyes focus or verge on something close and to be farther apart when the user's eyes focus or verge on something at a distance.

The eye-tracking information generated by the above-described eye-tracking subsystems may also be used, for example, to modify various aspect of how different computer-generated images are presented. For example, a display subsystem may be configured to modify, based on information generated by an eye-tracking subsystem, at least one aspect of how the computer-generated images are presented. For instance, the computer-generated images may be modified based on the user's eye movement, such that if a user is looking up, the computer-generated images may be moved upward on the screen. Similarly, if the user is looking to the side or down, the computer-generated images may be moved to the side or downward on the screen. If the user's eyes are closed, the computer-generated images may be paused or removed from the display and resumed once the user's eyes are back open.

The above-described eye-tracking subsystems can be incorporated into one or more of the various artificial reality systems described herein in a variety of ways. For example, one or more of the various components of system 900 and/or eye-tracking subsystem 1000 may be incorporated into augmented-reality system 700 in FIG. 7 and/or virtual-reality system 800 in FIG. 8 to enable these systems to perform various eye-tracking tasks (including one or more of the eye-tracking operations described herein).

EXAMPLE EMBODIMENTS

Example 10: A method for predictively downloading volumetric data may include (i) identifying an augmented reality device that (a) downloads volumetric data files representing pre-rendered three-dimensional segments of physical space within an augmented reality environment and (b) displays the augmented reality environment for viewing by a user, (ii) determining, based at least in part on a position of the user within the augmented reality environment, an expected physical space within the augmented reality environment that the user is predicted to view via the augmented reality device, and (iii) preemptively downloading, to the augmented reality device, a volumetric data file representing a pre-rendered three-dimensional segment of the expected physical space.

Example 2: The computer-implemented method of example 1, where determining the expected physical space within the augmented reality environment that the user is predicted to view includes determining, by the augmented reality device, the expected physical space and preemptively downloading the volumetric data file includes preemptively downloading, by the augmented reality device, the volumetric data file.

Example 4: The computer-implemented method of examples 1-2, where the augmented reality device includes a headset dimensioned to be worn on the user's head and display the augmented reality environment via a display surface in front of the user's eyes.

Example 3: The computer-implemented method of examples 1-3, wherein determining the expected physical space within the augmented reality environment that the user is predicted to view includes determining that the user is predicted to view the expected physical space within a predetermined window of upcoming time.

Example 5: The computer-implemented method of examples 1-4, where determining the expected physical space within the augmented reality environment that the user is predicted to view includes monitoring movement of the user through the augmented reality environment and predicting, based on the movement, that expected future movement of the user through the augmented reality environment will bring the expected physical space into a field of vision of the user.

Example 6: The computer-implemented method of examples 1-5, where determining the expected physical space within the augmented reality environment that the user is predicted to view includes monitoring a directionality of a gaze of the user within the augmented reality environment and predicting, based on the directionality of the gaze, that an expected future gaze of the user will bring the expected physical space into a field of vision of the user.

Example 7: The computer-implemented method of examples 1-6, where determining the expected physical space within the augmented reality environment that the user is predicted to view includes determining a viewing distance of the expected physical space relative to a position of the user within the augmented reality environment and specifying a quality of the volumetric data file that is correlated to the viewing distance such that a larger, higher-viewing-quality file is correlated with a nearer viewing distance and a smaller, lower-viewing-quality file is correlated with a farther viewing distance.

Example 8: The computer-implemented method of examples 1-7, where preemptively downloading the volumetric data file includes downloading a version of the volumetric data file of the specified quality.

Example 9: The computer-implemented method of examples 1-8 may further include determining that the viewing distance has decreased and, in response to determining that the viewing distance has decreased, downloading a higher quality version of the volumetric data file.

Example 10: The computer-implemented method of examples 1-9, where the augmented reality device includes limited physical memory such that the limited physical memory is not capable of storing volumetric data files representing the totality of the augmented reality environment.

Example 11: The computer-implemented method of examples 1-10, where the volumetric data file includes a combination of pre-rendered content and placeholders for personalized data that is personalized based on the user.

Example 12: The computer-implemented method of examples 1-11 may further include detecting that an avatar of the user has entered the expected physical space and triggering an event stored in the volumetric data file in response to detecting that the avatar of the user has entered the expected physical space.

Example 13: A computer-implemented method for predictively downloading volumetric data may include (i) identifying, by a media server, an augmented reality device that (a) downloads, from the media server, volumetric data files representing pre-rendered three-dimensional segments of physical space within an augmented reality environment and (b) displays the augmented reality environment for viewing by a user, (ii) determining, based at least in part on a position of the user within the augmented reality environment, an expected physical space within the augmented reality environment that the user is predicted to view via the augmented reality device, and (iii) preemptively downloading, from the media server to the augmented reality device, a volumetric data file representing a pre-rendered three-dimensional segment of the expected physical space.

Example 14: The computer-implemented method of example 13, where the media server includes a home media server that is connected to the augmented reality device via a local area network.

Example 15: The computer-implemented method of examples 13-14, where the media server includes a remote media server that is connected to the augmented reality device via the Internet.

Example 16: The computer-implemented method of examples 14-15, where wherein determining the expected physical space within the augmented reality environment that the user is predicted to view includes monitoring movement of the user through the augmented reality environment and predicting, based on the movement, that expected future movement of the user through the augmented reality environment will bring the expected physical space into a field of vision of the user.

Example 17: The computer-implemented method of examples 14-16, where determining the expected physical space within the augmented reality environment that the user is predicted to view includes monitoring a directionality of a gaze of the user within the augmented reality environment and predicting, based on the directionality of the gaze, that an expected future gaze of the user will bring the expected physical space into a field of vision of the user.

Example 18: A system for predictively downloading volumetric data may include (i) an augmented reality device that (a) identifies a media server that stores volumetric data files representing pre-rendered three-dimensional segments of physical space within an augmented reality environment, (b) in response to at least one predetermined trigger, downloads, from the media server, the volumetric data files, and (c) displays the augmented reality environment for viewing by a user, and (ii) a predictive download module that (a) determines, based at least in part on a position of the user within the augmented reality environment, an expected physical space within the augmented reality environment that the user is predicted to view via the augmented reality device and (b) triggers a download, from the media server to the augmented reality device, of a volumetric data file representing a pre-rendered three-dimensional segment of the expected physical space.

Example 19: The system of example 18, where the augmented reality device stores the predictive download module.

Example 20: The system of examples 18-19, where the media server includes a home media server that is connected to the augmented reality device via a local area network and stores the predictive download module.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive image data to be transformed, transform the image data into a data structure that stores user characteristic data, output a result of the transformation to select a customized interactive ice breaker widget relevant to the user, use the result of the transformation to present the widget to the user, and store the result of the transformation to create a record of the presented widget. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
identifying an augmented reality device that:
downloads volumetric data files representing pre-rendered three-dimensional segments of physical space within an augmented reality environment; and
displays the augmented reality environment for viewing by a user;
determining, based at least in part on an expected future position of the user within the augmented reality environment, an expected physical space within the augmented reality environment that the user is predicted to view via the augmented reality device; and
preemptively downloading, to a memory of the augmented reality device, a volumetric data file representing a pre-rendered three-dimensional segment of the expected physical space.

2. The computer-implemented method of claim 1, further comprising:
determining, based at least in part on an additional expected future position of the user within the augmented reality environment, that the user is no longer predicted to view the expected physical space; and
removing, from the memory of the augmented reality device, the volumetric data file representing the pre-rendered three-dimensional segment of the expected physical space.

3. The computer-implemented method of claim 1, further comprising:
determining that an additional physical space within the augmented reality environment is occluded from the expected future position; and
refraining from downloading a volumetric data file representing a pre-rendered three-dimensional segment of the additional physical space.

4. The computer-implemented method of claim 1, wherein the volumetric data file corresponds to a rectilinear area of three-dimensional space.

5. The computer-implemented method of claim 1, wherein determining the expected physical space within the augmented reality environment that the user is predicted to view comprises determining that the user is predicted to view the expected physical space within a predetermined window of upcoming time.

6. The computer-implemented method of claim 1, wherein determining the expected physical space within the augmented reality environment that the user is predicted to view comprises:
monitoring a directionality of a gaze of the user within the augmented reality environment; and
predicting, based on the directionality of the gaze, that an expected future gaze of the user will bring the expected physical space into a field of vision of the user.

7. The computer-implemented method of claim 1, wherein determining the expected physical space within the augmented reality environment that the user is predicted to view comprises:
determining a viewing distance of the expected physical space relative to the expected future position of the user within the augmented reality environment; and
specifying a quality of the volumetric data file that is correlated to the viewing distance such that a larger, higher-viewing-quality file is correlated with a nearer viewing distance and a smaller, lower-viewing-quality file is correlated with a farther viewing distance.

8. The computer-implemented method of claim 7, wherein preemptively downloading the volumetric data file comprises downloading a version of the volumetric data file of the specified quality.

9. The computer-implemented method of claim 7, further comprising:
determining that the viewing distance has decreased; and
in response to determining that the viewing distance has decreased, downloading a higher quality version of the volumetric data file.

10. The computer-implemented method of claim 1, wherein the augmented reality device comprises limited physical memory such that the limited physical memory is not capable of storing volumetric data files representing the totality of the augmented reality environment.

11. The computer-implemented method of claim 1, wherein the volumetric data file comprises a combination of pre-rendered content and placeholders for personalized data that is personalized based on the user.

12. The computer-implemented method of claim 1, further comprising:
detecting that an avatar of the user has entered the expected physical space; and
triggering an event stored in the volumetric data file in response to detecting that the avatar of the user has entered the expected physical space.

13. The computer-implemented method of claim 1, wherein:
determining the expected physical space within the augmented reality environment that the user is predicted to view comprises determining, by the augmented reality device, the expected physical space; and
preemptively downloading the volumetric data file comprises preemptively downloading, by the augmented reality device, the volumetric data file.

14. A computer-implemented method comprising:
identifying, by a media server, an augmented reality device that:
downloads, from the media server, volumetric data files representing pre-rendered three-dimensional segments of physical space within an augmented reality environment; and
displays the augmented reality environment for viewing by a user;
determining, based at least in part on an expected future position of the user within the augmented reality environment, an expected physical space within the augmented reality environment that the user is predicted to view via the augmented reality device; and preemptively downloading, from the media server to the augmented reality device, a volumetric data file representing a pre-rendered three-dimensional segment of the expected physical space.

15. The computer-implemented method of claim 14, further comprising:

determining, based at least in part on an additional expected future position of the user within the augmented reality environment, that the user is no longer predicted to view the expected physical space; and removing, from the memory of the augmented reality device, the volumetric data file representing the pre-rendered three-dimensional segment of the expected physical space.

16. The computer-implemented method of claim 14, further comprising:

determining that an additional physical space within the augmented reality environment is occluded from the expected future position; and refraining from downloading a volumetric data file representing a pre-rendered three-dimensional segment of the additional physical space.

17. The computer-implemented method of claim 14, wherein the media server comprises a home media server that is connected to the augmented reality device via a local area network.

18. The computer-implemented method of claim 14, wherein the media server comprises a remote media server that is connected to the augmented reality device via the Internet.

19. The computer-implemented method of claim 14, wherein determining the expected physical space within the augmented reality environment that the user is predicted to view comprises:

monitoring a directionality of a gaze of the user within the augmented reality environment; and predicting, based on the directionality of the gaze, that an expected future gaze of the user will bring the expected physical space into a field of vision of the user.

20. A system comprising:

an augmented reality device that:

identifies a media server that stores volumetric data files representing pre-rendered three-dimensional segments of physical space within an augmented reality environment;

in response to at least one predetermined trigger, downloads, from the media server, the volumetric data files; and displays the augmented reality environment for viewing by a user; and a predictive download module that:

determines, based at least in part on an expected future position of the user within the augmented reality environment, an expected physical space within the augmented reality environment that the user is predicted to view via the augmented reality device; and triggers a download, from the media server to the augmented reality device, of a volumetric data file representing a pre-rendered three-dimensional segment of the expected physical space.

* * * * *